United States Patent
Bershansky et al.

(10) Patent No.: US 10,235,158 B2
(45) Date of Patent: Mar. 19, 2019

(54) OPTIMIZING FEATURE DEPLOYMENT BASED ON USAGE PATTERN

(71) Applicant: Microsoft Technology Licensing, LLC, Redmond, WA (US)

(72) Inventors: Gregory Bershansky, Sammamish, WA (US); Anil Mehra, Medina, WA (US); Sanjay Garg, Redmond, WA (US); Christian D. Molnar, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 15/464,428

(22) Filed: Mar. 21, 2017

(65) Prior Publication Data

US 2018/0275980 A1    Sep. 27, 2018

(51) Int. Cl.
*G06F 8/65* (2018.01)
(52) U.S. Cl.
CPC ..................................... *G06F 8/65* (2013.01)
(58) Field of Classification Search
None
See application file for complete search history.

(56) References Cited

U.S. PATENT DOCUMENTS

| | | | |
|---|---|---|---|
| 2004/0255290 A1 | 12/2004 | Bates et al. | |
| 2006/0101450 A1 | 5/2006 | Datta et al. | |
| 2009/0138292 A1* | 5/2009 | Dusi | G06Q 10/06 705/7.32 |
| 2013/0159984 A1 | 6/2013 | Misovski et al. | |
| 2014/0012797 A1* | 1/2014 | Rao | G06Q 10/06 706/48 |
| 2014/0137080 A1 | 5/2014 | Huang et al. | |
| 2015/0058822 A1 | 2/2015 | Elias et al. | |
| 2015/0169850 A1 | 6/2015 | Chen et al. | |
| 2015/0212809 A1* | 7/2015 | Redmer | G06F 11/30 717/168 |
| 2015/0242470 A1* | 8/2015 | Ben-Itzhak | G06Q 30/02 707/722 |
| 2015/0286559 A1 | 10/2015 | Hu et al. | |
| 2016/0239280 A1* | 8/2016 | Scheiner | G06F 8/60 |

OTHER PUBLICATIONS

Yan, et al., "AppJoy: Personalized Mobile Application Discovery", In Proceedings of the 9th international conference on Mobile systems, applications, and services, Jun. 28, 2011, pp. 113-126.

* cited by examiner

*Primary Examiner* — Philip Wang

(57) ABSTRACT

Variety of approaches to optimize a feature deployment based on an usage pattern are described. A hosted service initiates operations to optimize the feature deployment upon detecting a feature update associated with an application. Next, a target audience for the feature update is identified by processing an usage pattern signal of the application based on information update and an organizational rule associated with the feature update. The feature update is deployed to the target audience.

20 Claims, 6 Drawing Sheets

OPTIMIZING FEATURE DEPLOYMENT BASED ON USAGE PATTERN

BACKGROUND

Information exchange have changed processes associated with work and personal environments. Automation and improvements in processes have expanded scope of capabilities offered for personal and business data consumption. With the development of faster and smaller electronics, execution of mass processes at cloud systems have become feasible. Indeed, applications provided by data centers, data warehouses, data workstations have become common features in modern personal and work environments. Such systems provide a wide variety of services that manage and monitor feature deployment(s) associated with applications.

Increasingly, application management service(s) are utilized to manage a lifecycle of an application. The management service(s) deploy the application, monitor usage, manage feature update(s), and/or perform other tasks associated with the application. However, there are currently significant gaps when deploying a feature update based on an usage pattern. Personnel resources are unnecessarily consumed for predicting demand for the feature update. Lack of relevant feature demand inference schemes cause poor management of personnel resources when attempting to deploy a feature update for an application.

SUMMARY

This summary is provided to introduce a selection of concepts in a simplified form that are further described below in the Detailed Description. This summary is not intended to, exclusively identify key features or essential features of the claimed subject matter, nor is it intended as an aid in determining the scope of the claimed subject matter.

Embodiments are directed to an optimization of a feature deployment based on an usage pattern. A hosted service, according to embodiments, may initiate operations to optimize the feature deployment upon detecting a feature update associated with an application. A target audience for the feature update may be identified by processing an usage pattern signal of the application based on information and an organizational rule associated with the feature update. Next, the feature update may be deployed to the target audience.

These and other features and advantages will be apparent from a reading of the following detailed description as a review of the associated drawings. It is to be understood that both the foregoing general description and the following detailed description are explanatory and do not restrict aspects as claimed.

DETAILED DESCRIPTION

Figure 1:
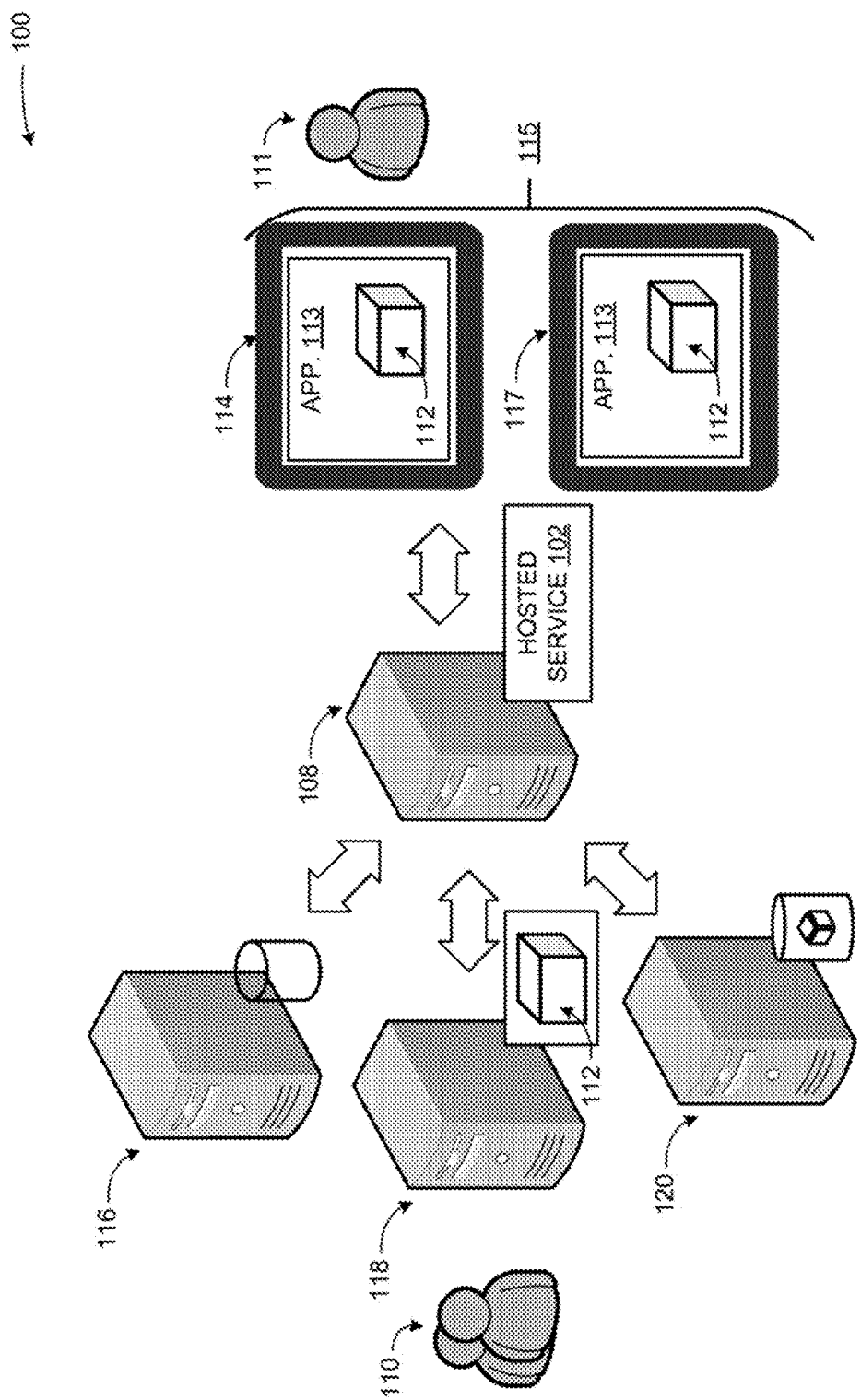
FIG. 1 is a conceptual diagram illustration examples of optimizing a feature deployment based on an usage pattern, according to embodiments.

As briefly described above, a hosted service may optimize a feature deployment based on an usage pattern. In an example scenario, the hosted service may detect a feature update associated with an application. A product source, such as an application development system, may notify the hosted service of an availability of the feature update. The feature update may be provided to the product source by a team of developers (or an individual developer).

Next, a target audience for the feature update may be identified by processing an usage pattern signal of the application. The target audience limy include client device(s) that render instance(s) of the application. The usage pattern signal may be received from an usage pattern source (such as an application telemetry collection system) upon querying the usage pattern source with information and an organizational rule associated with the feature update. The usage pattern signal may include a collection of measurements associated with the application that is customized to match to the information and the organizational rule associated with the feature update.

The usage pattern signal may be processed based on information and an organizational rule associated with the feature update. The information associated with feature update may include a name, a type, and a relationship to an existing feature, among other properties associated with the feature update. An organizational rule source may be queried with the information associated with the feature update. In response, organizational rule may be received. The organizational rule may match the information associated with the feature update. The feature update may next be deployed to the target audience. Feedback associated with the feature update may also be collected and provided to a team of developers who may use the feedback to refine the feature update and/or provide additional feature update(s).

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for optimizing a feature, deployment based on an usage pattern. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating examples of optimizing a feature deployment based on an usage pattern, according to embodiments.

In a diagram 100, a server 108 may execute (or provide) a hosted service 102. The server 108 may include a physical server providing service(s) and/or application(s) to client devices. A service may include an application performing operations in relation to a client application and/or a subscriber, among others. The server 108 may include and/or is part of a workstation, a data warehouse, a data center, and/or a cloud based distributed computing source, among others.

The server 108 may execute the hosted service 102. The hosted service 102 may initiate operations to optimize the feature deployment upon detecting a feature update 112 associated with an application 113 executed in a client device 114 or another instance of the application 113 executed in a client device 117. Different users may interact with different instances of the application 113 rendered on the client devices (114 and 117). Alternatively, a single user (such as a user 111) may interact with different instances of the application 113 rendered on the client devices (114 and 117). A feature may include a functionality, a service, and/or an operation, among others provided by the application 113. The feature update 112 may include a crew feature, a revision to an existing feature, and/or a repair to an error in an existing feature of the application 113.

A product source 118, such as an application development system, may notify the hosted service 102 of an availability of the feature update 112. A team of developers 110 (or an individual developer) may provide the feature update 112. The team of developers 110 may provide the feature update 112 with an instruction for deployment. Alternatively, the hosted service may automatically query the product source 118 for the feature update 112 to initiate deployment operations.

Next, a target audience 115 for the feature update 112 may be identified by, processing an usage pattern signal of the application 113. The target audience may include client devices (114 and 117) that render instance(s) of the application 113. The usage pattern signal may be received from an usage pattern source 116 (such as an application telemetry collection system) upon querying the usage pattern source 116 with information and organizational rule associated with the feature update 112. The usage pattern signal may include a collection of measurements associated with the application 113 that matches the information associated with the feature update 112. For example, measurements associated with historical use of an existing feature may be requested as the usage pattern signal for a revision of the existing feature.

The usage pattern signal may be processed based on an information and an organizational rule associated with the feature update 112. The information associated with the feature update 112 may include a name, a type, and/or a relationship to an existing feature, among other properties of the feature update 112. The organizational rule may describe parameters associated with the deployment such as an attribute associated with the client device's) (114 and/or 117) that is necessary for selecting the client devices) (114 and/or 117) to the target audience 115. Furthermore, organizational rule source 120 may be queried with the information associated with the feature update 112. In response, an organizational rule may be located and received from the organizational rule source 120. The organizational rule may match the information associated with the feature update 112. The feature update may next be deployed to the target audience 115. Feedback associated with the feature update may also be collected and provided to a team of developers who may use the feedback to refine the feature update and/or provide additional feature update(s). The feedback may be collected from the user 111 of the client device 114 (among other user(s) of the client devices 114 and/or 117).

The server 108 may communicate with the client device 114, the client device 117, the usage pattern source 116, the product source 118, and/or the organizational rule source 120 through a network. The network may provide wired or wireless communications between network nodes such as the client device 114, the client device 117, the server 108, the usage pattern source 116, the product source 118, and/or the organizational rule source 120, among others. Previous example(s) to optimize a feature deployment based on an usage pattern are not provided in a limiting sense. Alternatively, the hosted service 102 may provide the feature update 112 to the application 113 as a desktop application, a workstation application, and/or a server application, among others. The application 113 may also include a client it interacting with the hosted service 102.

The team of developers 110 may interact with a client interface of the hosted service, anchor the product source 118 with a keyboard based input, a mouse based input, a voice based input, a pen based input, and a gesture based input, among others. The gesture based input may include one or more touch based actions such as a touch action, a swipe action, and a combination of each, among others. Furthermore, the target audience 115 may interact with the application 113 through a variety of input types including gesture based input, among others.

While the example system in FIG. 1 has been described with specific components including the server 108, the hosted service 102, embodiments are not limited to these components or system configurations and can be implemented with other system configuration employing fewer or additional components.

Figure 2:
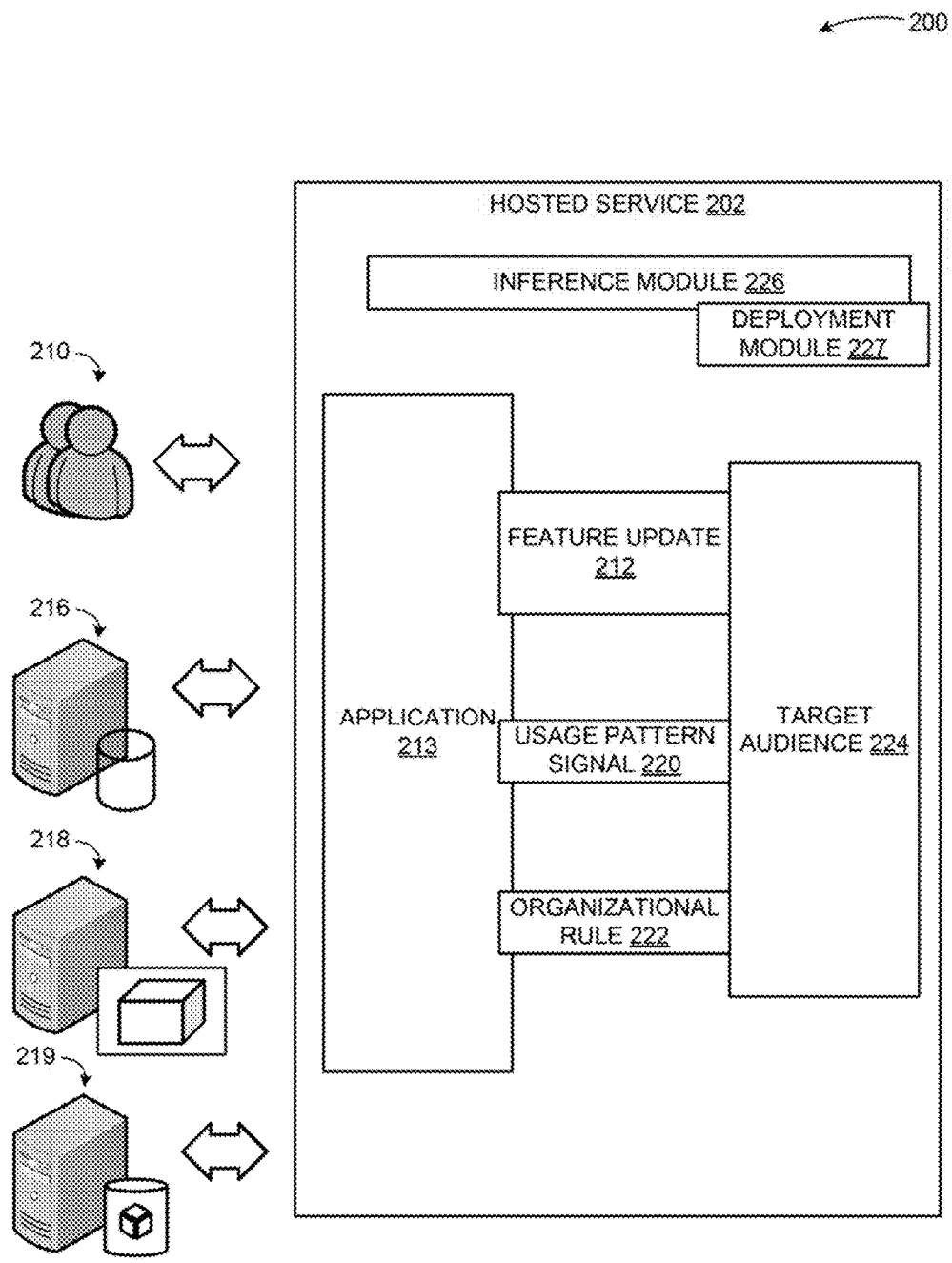
FIG. 2 is a display diagram illustrating example components of a hosted service that optimizes a feature deployment based on an usage pattern, according to embodiments.

FIG. 2 is a display diagram illustrating example components of a hosted service that optimizes a feature deployment based on an usage pattern, according to embodiments.

As illustrated in diagram 200, an inference module 226 of a hosted service 202 may detect a feature update 212 associated with an application 213. A notification from a product source 218 may inform the hosted service 202 of an availability of the feature update 212. The product source 218 may transmit the notification upon receiving the feature update 212 from a team of developers 210. The feature update 212 may include a new feature, a revision to an existing, feature, and a repair of an error in an existing feature.

In an example scenario, the feature update 212 may be provided in a variety of scenarios. For example, a new feature may be provided as the feature update 212. In such a scenario, the inference module 226 may identify a target audience 224 that includes client device(s) that render instance(s) of the application 213. In another example scenario, a revision to an existing feature may be provided as the feature update 212. In such a scenario, the inference module 226 may identify a target audience 224 that includes, the client device(s) that render the existing feature of the application 213. Furthermore, a repair of an error in an existing feature of the application 213 may be provided as the feature update 212. In such scenario, the inference module 226 may identify a target audience 224 that includes the client device(s) that may be impacted by the repair.

The inference module 226 may also transmit to the target audience 224 a notification that includes mitigation step(s) to correct the error in the existing feature of the application 213. The notification may instruct the client device(s) to provide the notification to user(s) of the client device(s) to prompt the user(s) to take corrective action based on the mitigation step(s). Alternatively, the inference module 226 may transmit a notification that includes automated mitigation instruction(s) to correct the error in the existing feature. The client device(s) may be prompted to execute the automated mitigation instruction(s) to correct the error in the existing feature.

As such, the inference module 226 may identify the target audience 224 by processing an usage pattern signal 220 retrieved from an usage pattern source 216. The usage pattern source 216 may include an application telemetry collector that collects measurements associated with use of the application 213. The measurements may capture a time, a duration, a type, a frequency, among other attributes associated with an interaction(s) by a client device or a user of the client device with a feature of the application 213. A custom set of measurements may make up the usage pattern signal 220 that matches information associated with the feature update 212.

The usage pattern signal 220 may be processed with the feature update and an organizational rule 222 associated with the feature update 212. The organizational rule source 219 may be queried with the information associated with the feature update 212. In response, the organizational rule 222 that matches the information associated with the feature update 212 may be received from the organizational rule source 219. The organizational rule 222 may describe property(s) and/or attribute(s), among other criteria that may be necessary for a client device to be selected for inclusion in the target audience 224. A deployment module 227 may deploy the feature update 212 to the target audience 224.

Figure 3:
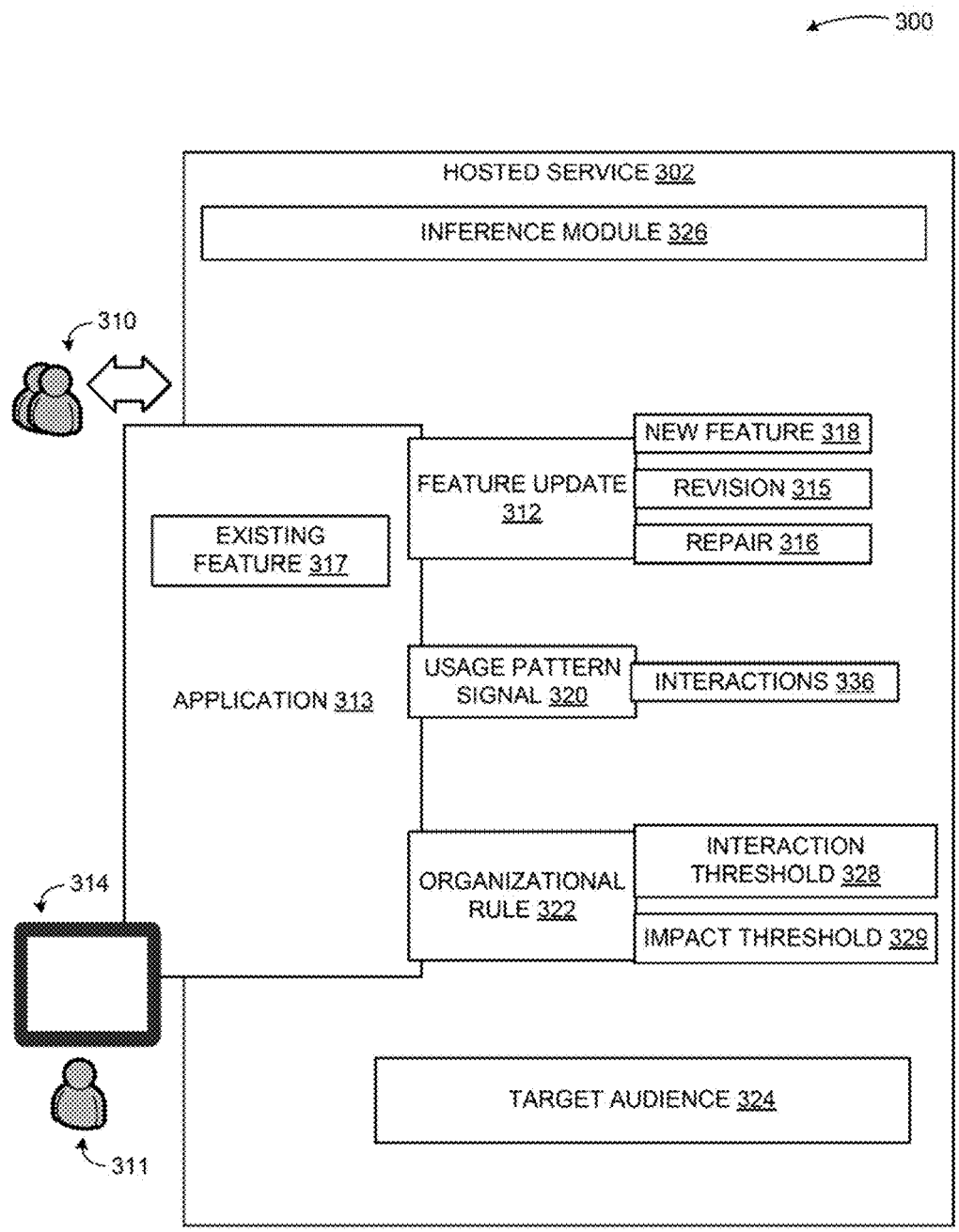
FIG. 3 is a display diagram illustrating components of a scheme to optimize a feature deployment based on an usage pattern, according to embodiments.

FIG. 3 is a display diagram illustrating components of a scheme to optimize a feature deployment based on an triage pattern, according to embodiments.

As shown in a diagram 300, an inference module 326 of a hosted service 302 may process an usage pattern signal 320 based on information and an organizational rule 322 associated with a feature update 312 to identify a target audience 324 for the feature update 312. The feature update 312 may be processed for a deployment into the application 313. The application 313 may be rendered by a multitude of client devices some of which may be selected as the target audience 324 based on an analysis of the usage pattern signal 320.

The feature update 312 may include a stew feature 318, a vision 315 to an existing feature 317, and/or a repair 316 to an error in the existing feature 317 of the application 313. The target audience 324 may be customized based on demand(s) by each type of the feature update 312. For example, the feature update 312 may be determined as the new feature 318 of the application 113. In response, a client device 314 rendering the application 313 may be identified by processing the usage pattern signal 320 based on an organizational rule 322 that matches information associated with the feature update 312. The client device 314 and/or other client device may be included in the target audience 324 upon identifying the client device 314 and/or other client device(s) as rendering the application 313.

For example, the organizational rule 322 may describe an identification process of the client device 314 based on an interaction threshold 328 associated with the application 313. An interaction metric (located in the usage patter a signal 320) may include a number interactions by a user 311 of the client device 314 with the application 313 during a time-period. The interaction metric may be compared to the interaction threshold 328 specified by the organizational rule 322. If the interaction metric exceeds the interaction threshold 328 then the client device is selected for the target audience 324. Otherwise, the client device is not selected for the target audience 324. The organizational rule 322 that encapsulates the interaction threshold 328 may be configurable by a stakeholder associated with the application 313 or configured automatically based on system criteria.

In an example scenario, the feature update 312 may be determined as the revision 315 to the existing feature 317 of the application 313. The revision 315 may modify a functionality of the existing feature 317. The modification may positively impact the functionality. As such, the inference module 326 may include the client device 314 (that renders the existing feature 317 of the application 313) in the target audience 324 for the revision 315.

The inference module 326 may select the client device 314 by matching information associated with the revision 315 to the organizational rule 322. The organizational rule 322 may describe the interaction threshold 328 as applied to the client device 314. If the interaction metric associated with the client device 314 (and/or the user of the client device 314) and the existing feature 317 exceeds the interaction threshold 328, the client device 314 may be included in the target audience 324. Alternatively, if the interaction metric does not exceed the interaction metric, the client device 314 may not be included in the target audience 324.

Furthermore, the inference module 326 may determine the feature update 312 as the repair 316 for an error in the existing feature 317 of the application 313. In such a scenario, information associated with the feature update 312 may be matched to the organizational rule 322 that describes an impact threshold 329. The impact threshold 329 may be compared to an error metric associated with the client device 314 and the existing feature 317. The error metric may include a count of how many errors the client device 314 has received, generated, and/or detected regarding the existing feature 317. If the error metric is detected as exceeding the impact threshold 329 then the client device 314 may be added to the target audience 324. Otherwise, it the error metric is detected as not exceeding the impact threshold 329 then the client device 314 may not be added to the target audience 324.

Examples of selecting user(s) for the target audience 324 were not provided in a limiting sense. Other measurements (stored in the usage pattern signal 320) associated with the client device 314 that renders the application 313 and/or the user 311 of the client device 314 may be considered when selecting the client device 314 to the target audience 324. The other measurements may be evaluated based on organizational rule(s) associated with the feature update 312. For example, the organizational rule 322 may describe threshold(s) or other criteria for comparison against a duration, a frequency, and/or a timing, among other properties associated with interactions between the client device 314 (and/or the user 311 of the client device 314 and past and/or existing feature deployment(s) for an inclusion of the client device 314 to the target audience 324.

Furthermore, the organizational rule 322 may be detected to describe a gradual deployment of a new feature, a revision to an existing feature, and/or a repair to an error in an existing feature (as the feature update 312). In such a scenario, the new feature 318, the revision 315 to the existing feature 317, and/or the repair to an error in the existing feature 317 may be initially deployed to the client device 314 that is identified as impacted by the feature update 312. The deployment to other client device(s) may continue gradually over a time-period based on instructions in the organizational rule 322, available resource(s) and/or other criteria.

As discussed above, the hosted service may be employed to perform operations to optimize a feature deployment based on an usage pattern. An increased performance and efficiency improvement with the hosted service 102 may occur as a result of processing an usage pattern based on information and an organizational rule associated with a feature update to identify a target audience for the feature update. Additionally, automating client device selection for the target audience, by the hosted service 102, may reduce processor load, increase processing speed, conserve memory, and reduce network bandwidth usage.

Embodiments, as described herein, address a need that arises from a lack of efficiency to optimize a feature deployment based on an usage pattern. The actions/operations described herein are not a mere use of a computer, but address results that are a direct consequence of software used as a service offered to large numbers of users and applications.

The example scenarios and schemas in FIG. 1 through 3 are shown with specific components, data types, and configurations. Embodiments are not limited to systems according to these example configurations. Optimizing a feature deployment based on an usage pattern may be implemented in configurations employing fewer or additional components in applications and user interfaces. Furthermore, the example schema and components shown in FIG. 1 through 3 and their subcomponents may be implemented in a similar manner with other values using the principles described herein.

Figure 4:
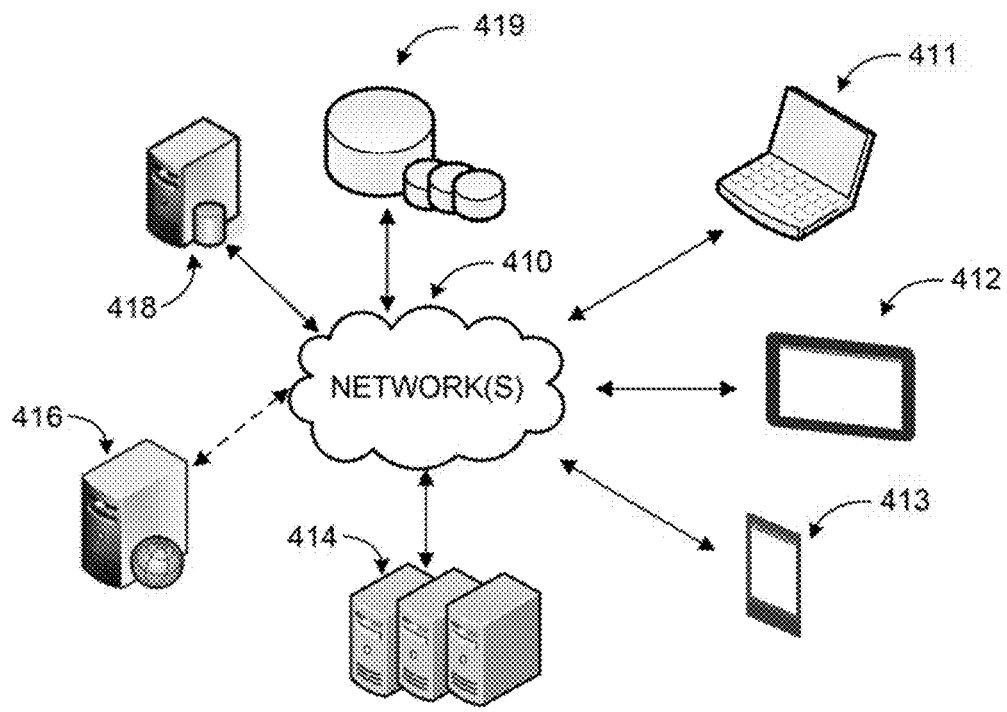
FIG. 4 is a simplified networked environment, where a system according to embodiments may be implemented.

FIG. 4 is an example networked environment, where embodiments may be implemented. A hosted service configured to optimize a feature deployment based on an usage pattern may be implemented via software executed over one or more servers 414 such as a hosted service. The platform may communicate with client applications on individual computing devices such as a smart phone 413, a mobile computer 412, or desktop computer 411 ('client devices') through network(s) 410.

Client applications executed on any of the client devices 411-413 may facilitate communications via application(s) executed by servers 414, or on individual server 416. A hosted service may detect a feature update associated with art application. A target audience for the feature update may be identified by processing an usage pattern signal of the application based on information and an organizational rule associated with the feature update. Next, the feature update may be deployed to the target audience. The hosted service may store data associated with the feature update in data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to optimize a feature deployment based on an usage pattern. Furthermore, the networked environments discussed in FIG. 4 are for illustration purposes only. Embodiments are not limited to the example applications, modules, or processes.

Figure 5:
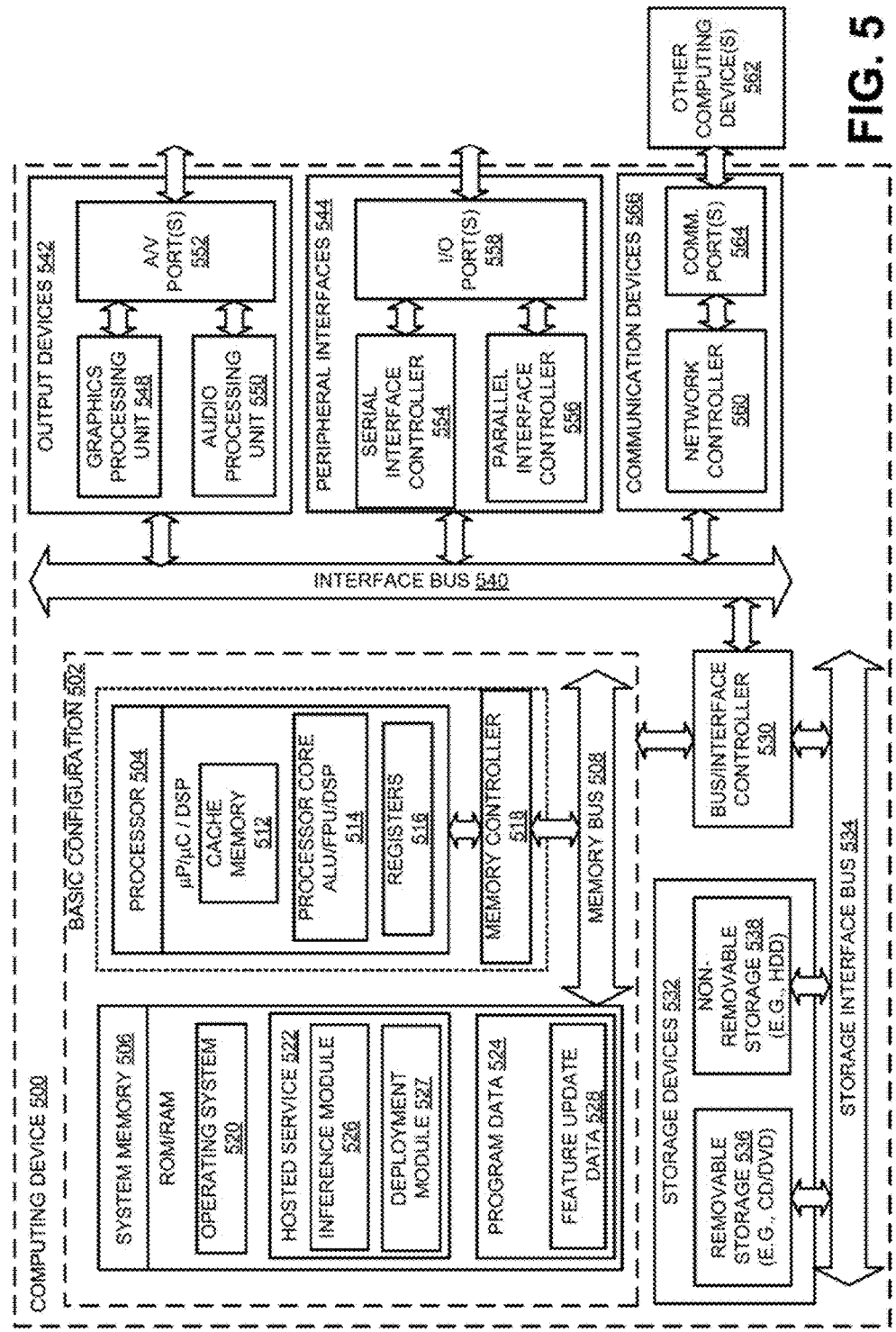
FIG. 5 is a block diagram of an example computing device, which may be used to optimize a feature deployment based on an usage pattern, according to embodiments.

FIG. 5 is a block diagram of an example computing device, which may be used to optimize a feature deployment based on an usage pattern, according to embodiments.

For example, computing device 500 may be used as a server desktop computer, portable computer, smart phone, special purpose computer, or similar device. In an example basic configuration 502, the computing device 500 may include one or more processors 504 and a system memory 506. A memory bus 508 may be used for communication between the processor 504 and the system memory 506. The basic configuration 502 may be illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.), or any combination thereof. The system memory 506 may include an operating system 520, a hosted service 522, and a program data 524. The hosted service 522 may include a component such as an inference module 526 and a deployment module 527. The inference module 526 and the deployment module 527 may execute the processes associated with the hosted service 522. The inference module 526 may detect a feature update associated with an application. A target audience for the feature update may be identified by processing an usage pattern signal of the application based on information and an organizational rule associated with the feature update. The deployment module 527 may deploy the feature update to the target audience.

Input to and output out of the hosted service 522 may be transmitted through a communication module associated with the computing device 500. An example of the communication module may include a communication device 566 that may be communicatively coupled to the computing device 500. The communication module may provide wired and/or wireless communication. The program data 524 may also include, among other data, feature update data 528, or the like, as described herein. The feature update data 528 may include an usage pattern signal, and/or an organizational rule, among others.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-retrievable storage devices 538, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program nodules, or other data.

The system memory 506, the removable storage devices 536 and the non removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example of the communication device(s) 566 includes a network controller 560, which may be arranged to facilitate communications with one or more other computing devices 562 over a network communication link via one or more communication ports 564. The one or more other computing devices 562 may include servers, computing devices, and comparable devices.

The network communication media may be one example of a communication media. Communication media may typically be embodied by computer readable instructions, data structures, program modules, or other data in a modulated data signal, such as a carrier wave, or other transport mechanism, and may include any information delivery media. A "modulated data signal" may be a signal that has one or more of its characteristics set or changed in such a manner as to encode information in the signal. By way of example, and not limitation, communication media may include wired media such as a wired network OT direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer, which includes any of the above functions. The computing device 500 may also be implemented as a personal computer including both laptop computer and non-laptop computer configurations. Additionally, the computing device 500 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to optimize a feature deployment based on an usage pattern. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
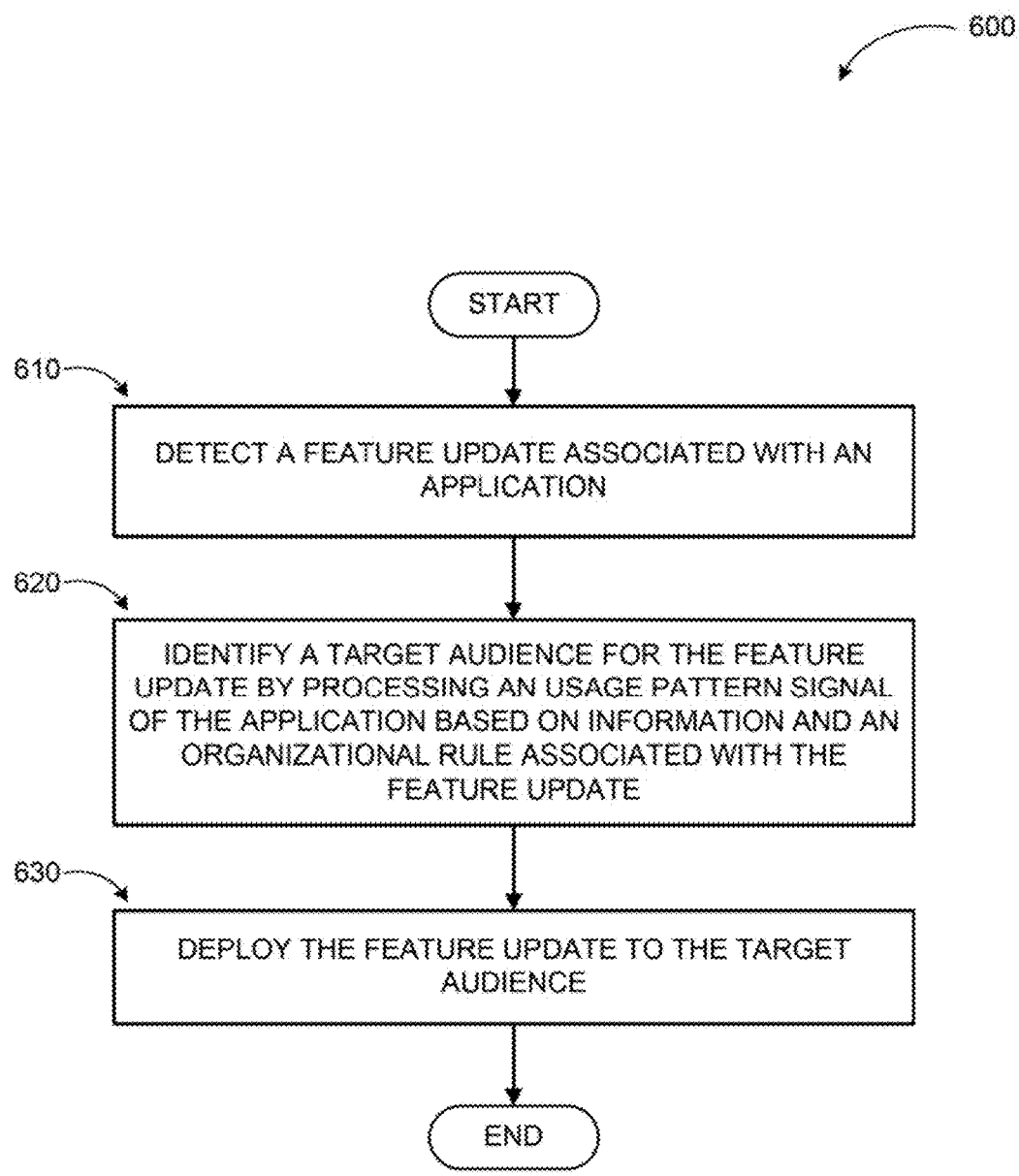
FIG. 6 is a logic flow diagram illustrating a process for optimizing a feature deployment based on an usage pattern, according to embodiments.

FIG. 6 is a logic flow diagram illustrating a process for optimizing a feature deployment based on an usage pattern, according to embodiments. Process 600 may be implemented on a computing device, such as the computing device 500 or another system.

Process 600 begins with operation 610, where the hosted service may detect a feature update associated with an application. A product source, such as an application development system, may notify the hosted service of an availability of the feature update.

Next, a target audience for the feature update may be identified by processing an usage pattern signal of the application at operation 620. The usage pattern signal may be received from an usage pattern source upon querying the usage pattern source with information and the organizational rule associated with the feature update. The usage pattern signal may include a collection of measurements associated with the application that is customized to match the information associated with the feature update.

The usage pattern signal may be processed based on the information and an organizational rule associated with the feature update. An organizational rule may be located and received in response to querying an organizational rule source with the information associated with the feature update. At operation 630, the feature update may be deployed to the target audience.

The operations included in process 600 is for illustration purposes. Optimizing a feature deployment based on an usage pattern may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a method executed on a computing device to optimize feature deployment based, on an usage pattern is described. The method includes detecting a feature update associated with an application, identifying a target audience for the feature update by processing an usage pattern signal of the application based on information and an organizational rule associated with the feature update, and deploying the feature update to the target audience.

In other examples, the information associated with the feature update includes one or more of a name, a type, and a relationship associated with an existing feature. Detecting the feature update associated with the application includes receiving a notification from a product source, wherein the notification describes the feature update associated with the application and retrieving the feature update. The method further includes querying an usage pattern source based on the information and the organizational rule associated with the feature update and receiving the usage pattern signal that matches the information associated with the feature update from the usage pattern source. The method further includes querying an organizational rule source based on the information associated with the feature update and receiving the organizational rule that matches the information associated the feature update from the organizational rule source.

In further examples, the method further includes determining the feature update as a new feature of the application, identifying a client device that renders the application by processing the usage pattern signal based on the organizational rule, and including the client device in the target audience. The organizational rule includes a comparison of a number of interactions of a user of the client device with the application to an interaction threshold. The organizational rule describes a gradual deployment of the new feature of the application to the client device that renders the application. The gradual deployment may be dependent on available resources such a network bandwidth, processing availability, storage availability, and/or memory availability, among others associated with the hosted service.

In other examples, the method further includes determining the feature update as a revision to an existing feature of the application, identifying a client device that renders the application by processing the usage pattern signal based on the organizational rule, and including the client device in the target audience. The organizational rule includes on a comparison of a number of interactions of a user of the client device with the existing feature to an interaction threshold. The organizational rule describes a gradual deployment of the revision to the existing feature of the application to the client device that renders the application.

In some examples, a server configured to optimize feature deployment based on an usage pattern is described. The server includes a communication module configured to facilitate communication between a hosted service and a client device, a memory configured to store instructions, and a processor coupled to the memory and the communication module. The processor executes the hosted service in conjunction with the instructions stored in the memory. The hosted service includes an inference module and a deployment module. The inference module is configured to receive a notification of a feature update associated with an application from a product source, retrieve the feature update from the product source, receive an usage pattern signal that matches information associated with the feature update upon querying an usage pattern source, receive an organizational rule that matches the information associated with the feature update upon querying an organizational rule source, and identify a target audience for the feature update by processing the usage pattern signal based on the information and the organizational rule associated with the feature update. The deployment module is configured to deploy the feature update to the target audience.

In other examples, the inference module is further configured to determine the feature update as a repair for an error in an existing feature of the application, identify the client device that renders the application by processing the usage pattern signal based on the organizational rule, and include the client device in the target audience. The organizational rule includes a comparison of a number of errors associated with the existing feature of the application to an impact threshold. The organizational rule describes a gradual deployment of the repair for the error in the existing feature of the application to the client device that renders the application. The inference module is further configured to identify other client device that renders the application by processing the usage pattern based on the organizational rule with an operation to compare a number of the errors associated with the existing feature of the application to an impact threshold and include the other client device in the target audience. The application includes one of a client interface provided by the hosted service, a stand-alone application, and other client interface provided by other service.

In some examples, a computer-readable memory device with instructions stored thereon to optimize feature deployment based on an usage pattern is described. The instructions include actions that are similar to the actions of the method.

In some examples, a means for optimizing feature deployment based on an usage pattern is described. The means for optimizing feature deployment based on an usage pattern include a means for detecting a feature update associated with an application, a means for identifying a target audience for the feature update by processing an usage pattern signal of the application based on information and an organizational rule associated with the feature update, and a means for deploying the feature update to the target audience.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to optimize feature deployment based on a usage pattern, the method comprising:
   detecting a feature update associated with an application;
   receiving a usage pattern signal that matches information associated with the feature update from a usage pattern source;
   receiving an organizational rule that matches the information associated with the feature update from the usage pattern source;
   identifying a target audience for the feature update by processing the usage pattern signal of the application based on the information and the organizational rule associated with the feature update; and
   deploying the feature update to the target audience.

2. The method of claim 1, wherein the information associated with the feature update includes one or more of a name, a type, and a relationship associated with an existing feature.

3. The method of claim 1, wherein detecting the feature update associated with the application comprises:
   receiving a notification from a product source, wherein the notification describes the feature update associated with the application; and
   retrieving the feature update.

4. The method of claim 1, further comprising:
   querying the usage pattern source based on the information and the organizational rule associated with the feature update.

5. The method of claim 1, further comprising:
   querying the organizational rule source based on the information associated with the feature update.

6. The method of claim 1, further comprising:
   determining the feature update as a new feature of the application;
   identifying a client device that renders the application by processing the usage pattern signal based on the organizational rule; and
   including the client device in the target audience.

7. The method of claim 6, wherein the organizational rule includes a comparison of a number of interactions of a user of the client device with the application to an interaction threshold.

8. The method of claim 6, wherein the organizational rule describes a gradual deployment of the new feature of the application to the client device that renders the application.

9. The method of claim 1, further comprising:
   determining the feature update as a revision to an existing feature of the application;
   identifying a client device that renders the application by processing the usage pattern signal based on the organizational rule; and
   including the client device in the target audience.

10. The method of claim 9, wherein the organizational rule includes on a comparison of a number of interactions of a user of the client device with the existing feature to an interaction threshold.

11. The method of claim 9, wherein the organizational rule describes a gradual deployment of the revision to the existing feature of the application to the client device that renders the application.

12. A server configured to optimize feature deployment based on an usage pattern, the server comprising:
   a communication module configured to facilitate communication between a hosted service and a client device;
   a memory configured to store instructions; and
   a processor coupled to the memory and the communication module, the processor executing the hosted service in conjunction with the instructions stored in the memory, wherein the hosted service includes:
      an inference module configured to:
         receive a notification of a feature update associated with an application from a product source;
         retrieve the feature update from the product source;
         receive an usage pattern signal that matches information associated with the feature update upon querying an usage pattern source;
         receive an organizational rule that matches the information associated with the feature update upon querying an organizational rule source;
         identify a target audience for the feature update by processing the usage pattern signal based on the information and the organizational rule associated with the feature update; and
      a deployment module configured to:
         deploy the feature update to the target audience.

13. The server of claim 12, wherein the inference module is further configured to:

determine the feature update as a repair for an error in an existing feature of the application;
identify the client device that renders the application by processing the usage pattern signal based on the organizational rule; and
include the client device in the target audience.

14. The server of claim 13, wherein the organizational rule includes a comparison of a number of errors associated with the existing feature of the application to an impact threshold.

15. The server of claim 13, wherein the organizational rule describes a gradual deployment of the repair for the error in the existing feature of the application to the client device that renders the application.

16. The server of claim 13, wherein the inference module is further configured to:
identify other client device that renders the application by processing the usage pattern based on the organizational rule with an operation to:
compare a number of the errors associated with the existing feature of the application to an impact threshold; and
include the other client device in the target audience.

17. The server of claim 13, wherein the application includes one of a client interface provided by the hosted service, a stand-alone application, and other client interface provided by other service.

18. A computer-readable memory device with instructions stored thereon to optimize feature deployment based on an usage pattern, the instructions comprising:
receiving a notification of a feature update associated with an application from a product source;
retrieving the feature update from the product source;
receiving an usage pattern signal that matches information associated with the feature update upon querying an usage pattern source;
receiving an organizational rule that matches information associated with the feature update upon querying an organizational rule source;
identifying a target audience for the feature update by processing the usage pattern signal based on information and the organizational rule associated with the feature update; and
deploying the feature update to the target audience.

19. The computer-readable memory device of claim 18, wherein the instructions further comprise:
determining the feature update as a new feature of the application;
identifying a client device of that renders the application by processing the usage pattern signal based on the organizational rule by comparing a number of interactions of a user of the client device with the application during a time-period to an interaction threshold; and
including the client device in the target audience.

20. The computer-readable memory device of claim 18, wherein the instructions further comprise:
determine the feature update as a repair for an error in an existing feature of the application;
identify a client device that renders the application by processing the usage pattern signal based on the organizational rule wherein the organizational rule describes a gradual deployment of the repair for the error in the existing feature of the application to the client device that renders the application; and
include the client device in the target audience.

* * * * *